United States Patent
Abe

(10) Patent No.: US 8,842,793 B2
(45) Date of Patent: Sep. 23, 2014

(54) COMMUNICATION CIRCUIT AND METHOD OF ADJUSTING SAMPLING CLOCK SIGNAL

(75) Inventor: Makio Abe, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 223 days.

(21) Appl. No.: 13/337,363

(22) Filed: Dec. 27, 2011

(65) Prior Publication Data

US 2012/0177160 A1    Jul. 12, 2012

(30) Foreign Application Priority Data

Jan. 6, 2011    (JP) .................... 2011-001151

(51) Int. Cl.
H04L 7/04    (2006.01)
H04L 7/033    (2006.01)

(52) U.S. Cl.
CPC .............. *H04L 7/044* (2013.01); *H04L 7/0331* (2013.01)
USPC ........................................ 375/362; 375/350

(58) Field of Classification Search
USPC ................................................ 375/362, 350
See application file for complete search history.

(56) References Cited

U.S. PATENT DOCUMENTS

| | | | | |
|---|---|---|---|---|
| 3,424,859 A | * | 1/1969 | Vogelman et al. | ................ 178/3 |
| 3,772,657 A | * | 11/1973 | Marsalka et al. | ............... 714/48 |
| 6,292,655 B1 | | 9/2001 | Kondo | |
| 2007/0047686 A1 | * | 3/2007 | Aoki et al. | .................... 375/374 |

FOREIGN PATENT DOCUMENTS

| | | |
|---|---|---|
| JP | 62-230117 | 10/1987 |
| JP | 04-329721 | 11/1992 |
| JP | 11-341089 | 12/1999 |
| JP | 2010-206533 | 9/2010 |

OTHER PUBLICATIONS

Japanese Office Action dated May 20, 2014.

* cited by examiner

*Primary Examiner* — Shuwang Liu
*Assistant Examiner* — Nader Bolourchi
(74) *Attorney, Agent, or Firm* — IPUSA, PLLC

(57) ABSTRACT

A communication circuit includes a sampling clock generating circuit generating a sampling clock signal having a frequency that is "m" times greater than a bit rate of the communication data and containing "n" pulses in each bit period of the communication data; and a sampling circuit sampling the communication data based on the sampling clock signal to obtain "n" sets of received data in each bit period of the communication data. The sampling clock generating circuit delays the sampling clock signal when a first one or more of the "n" sets of received data are different from a value of the rest of the "n" sets of received data, and advances the sampling clock signal when a value of a last one or more of the "n" sets of received data is different from a value of the rest of the "n" sets of received data.

9 Claims, 4 Drawing Sheets

COMMUNICATION CIRCUIT AND METHOD OF ADJUSTING SAMPLING CLOCK SIGNAL

CROSS-REFERENCE TO RELATED APPLICATION

The present application is based upon and claims the benefit of priority of Japanese Patent Application No. 2011-001151, filed on Jan. 6, 2011, the entire contents of which are incorporated herein by reference.

BACKGROUND OF THE INVENTION

1. Field of the Invention

An aspect of this disclosure relates to a communication circuit and a method of adjusting a sampling clock signal.

2. Description of the Related Art

There are communication circuits such as a universal asynchronous receiver transmitter (UART) that convert an asynchronous serial signal into a parallel signal and vice versa.

FIG. 5 is a block diagram illustrating a configuration of a related-art communication circuit. In FIG. 5, it is assumed that communication data represented by FIG. 6(A) are input to a terminal 1 and then supplied to a received data sampling circuit 2. The received data sampling circuit 2 detects a start bit in the communication data, generates a sampling clock signal represented by FIG. 6(B), and samples the communication data at timings when the sampling clock signal is high to obtain received data represented by FIG. 6(C). The received data are supplied to a received data storing register 3 and stored in the received data storing register 3 under the control of a communication control circuit 4.

Meanwhile, Japanese Laid-Open Patent Publication No. 11-341089, for example, discloses a technology where three sets of data are captured for each symbol period and the code of the symbol is determined based on the captured data according to a majority rule.

With related-art communication circuits and technologies, however, the sampling clock timing is fixed. Therefore, if the timing of the sampling clock signal becomes out of sync with the timing of received data due to, for example, an error in detection timing of a start bit, it may become difficult to correctly sample the received data.

SUMMARY OF THE INVENTION

In an aspect of this disclosure, there is provided a communication circuit that receives communication data in asynchronous serial communications. The communication circuit includes a sampling clock generating circuit configured to generate a sampling clock signal having a frequency that is "m" (an integer greater than or equal to 4) times greater than a bit rate of the communication data and containing "n" (an odd number less than "m") pulses in each bit period of the communication data, a sampling circuit configured to sample the communication data based on the sampling clock signal to obtain "n" sets of received data in each bit period of the communication data; and a majority circuit configured to perform a majority operation on values of the "n" sets of received data to determine a majority value and to output the majority value as received data of the corresponding bit period. The sampling clock generating circuit is configured to delay the sampling clock signal by a predetermined amount when a value of a first one or more of the "n" sets of received data is different from a value of the rest of the "n" sets of received data, and to advance the sampling clock signal by the predetermined amount when a value of a last one or more of the "n" sets of received data is different from a value of the rest of the "n" sets of received data.

DESCRIPTION OF THE PREFERRED EMBODIMENTS

Preferred embodiments of the present invention are described below with reference to the accompanying drawings.

<Communication Circuit>

Figure 1:
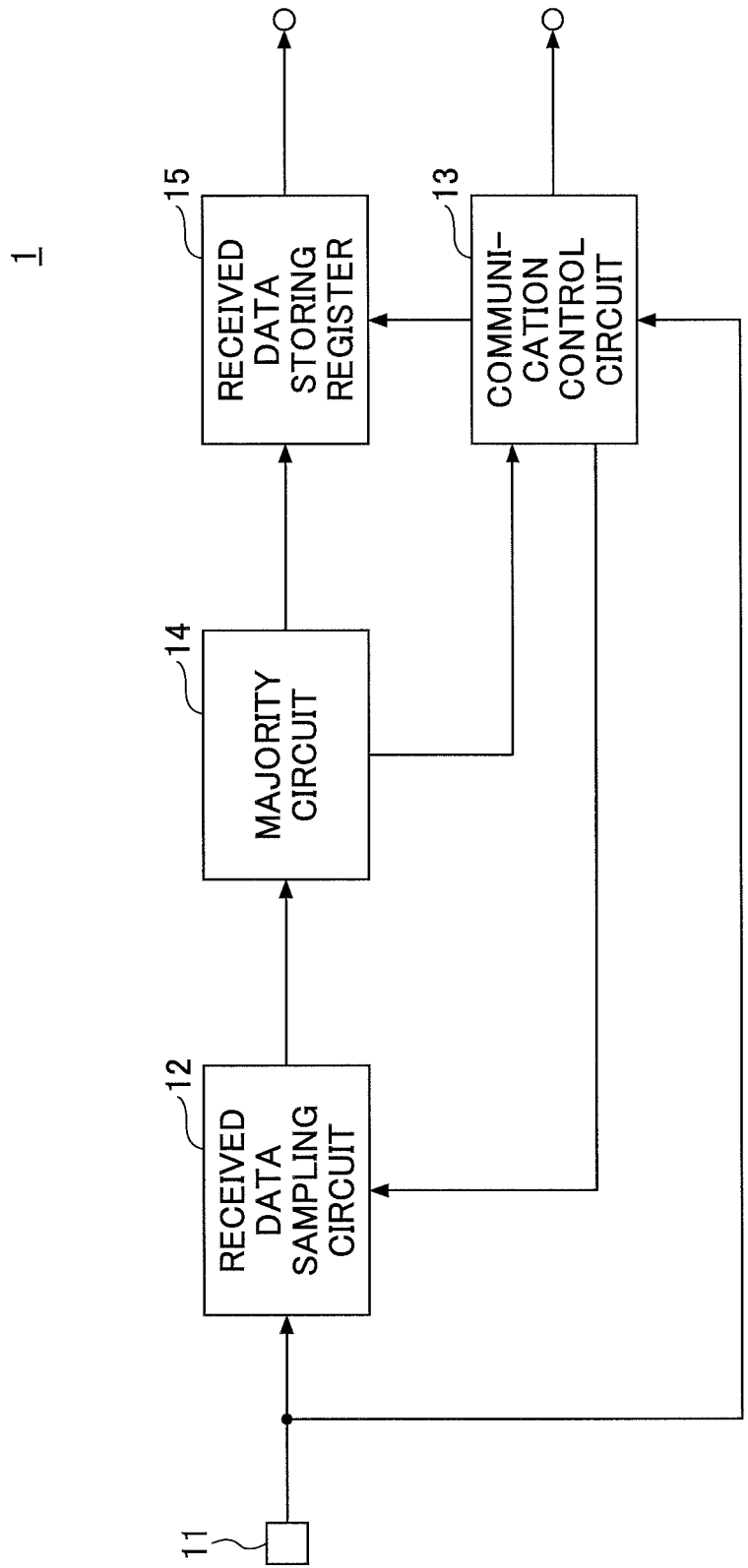
FIG. 1 is a block diagram illustrating an exemplary configuration of a communication circuit of an embodiment.
Figure 2:
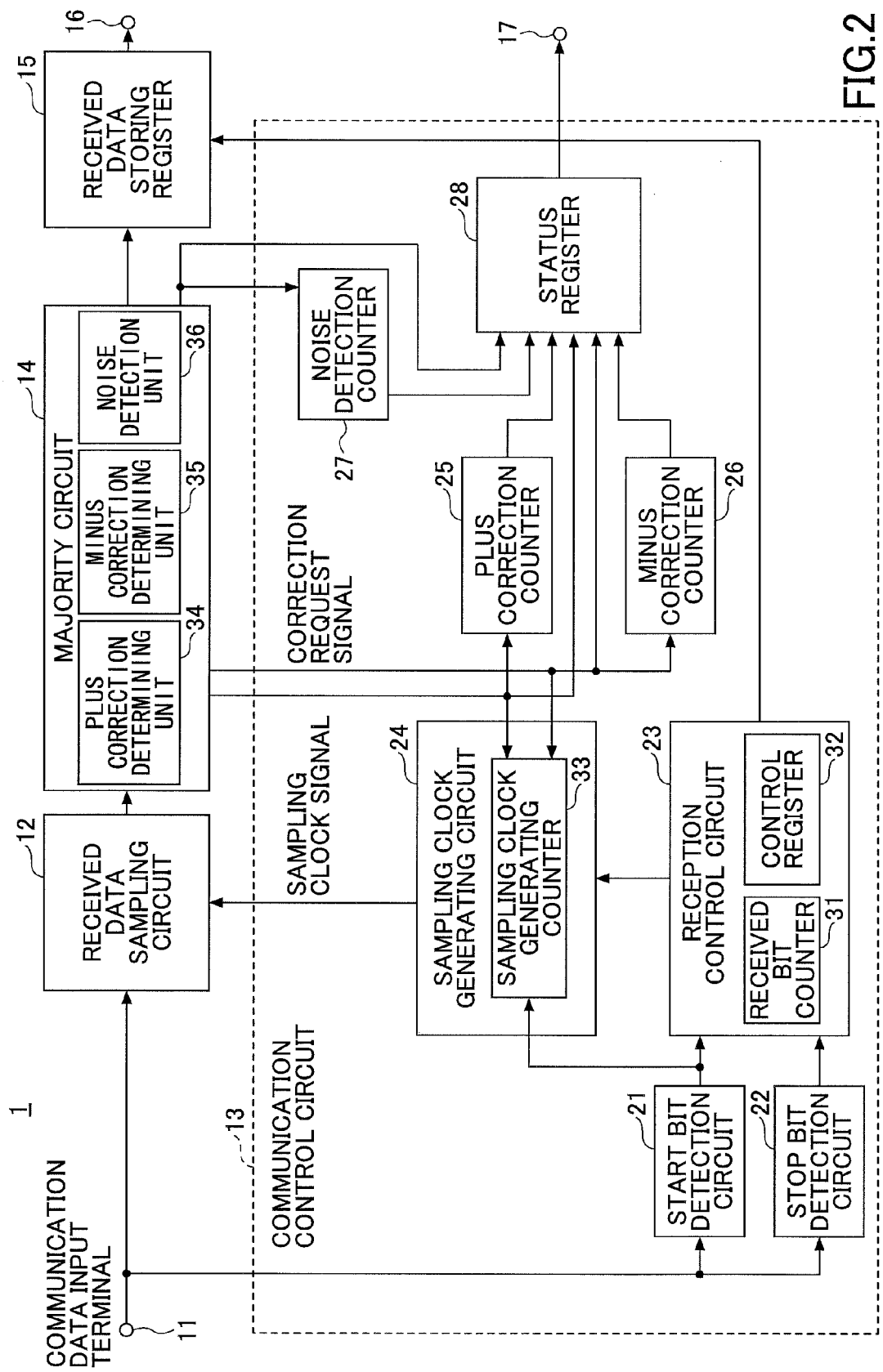
FIG. 2 is a block diagram illustrating a detailed configuration of a communication circuit of an embodiment.

FIGS. 1 and 2 illustrate an exemplary configuration of a communication circuit 1 of an embodiment. The communication circuit 1 of this embodiment may be configured to receive communication data in asynchronous serial communications (or to receive an asynchronous serial signal).

As illustrated in FIG. 1, the communication circuit 1 may include a received data sampling circuit 12, a communication control circuit 13, a majority circuit 14, and a received data storing register 15. Communication data from a communication channel are input to a terminal 11 and supplied to the received data sampling circuit 12 and the communication control circuit 13.

The communication control circuit 13 detects a start bit in the communication data and generates a sampling clock signal based on which the communication data are sampled. The sampling clock signal has a frequency that is "m" ("m" is an integer greater than or equal to 4) times greater than a bit rate (i.e., frequency) of the communication data and contains "n" ("n" is an odd number less than "m") pulses in each bit period of the communication data. Below, for descriptive purposes, it is assumed that m=4 and n=3. In other words, it is assumed that the sampling clock signal contains three pulses (clock pulses) in each bit period of the communication data.

The received data sampling circuit 12 samples the communication data based on the sampling clock signal and thereby obtains three sets of received data (hereafter called first, second, and third received data) in each bit period of the communication data. The received data sampling circuit 12 supplies the obtained received data to the majority circuit 14.

The majority circuit 14 performs a majority operation on the values represented by the first, second, and third received data to determine a majority value (e.g., when the first, second, and third received data represent values "1", "1", and "0", "1" is the majority value) and supplies the majority value as received data of the corresponding bit period to the received data storing register 15. Also, the majority circuit 14 generates a plus correction request signal when the value of the first received data is different from the value of the second and third received data, generates a minus correction request signal when the value of the third received data is different from the value of the first and second received data, and generates a noise detection signal when the value of the second received data is different from the value of the first and third received data. The majority circuit 14 supplies the generated signals to the communication control circuit 13.

Here, if the communication data are sampled seven times in each bit period, the majority circuit 14 may be configured to generate a plus correction request signal when at least one of the values of the first and second received data is different from the value of the third through seventh received data, to generate a minus correction request signal when at least one of the values of the sixth and seventh received data is different from the value of the first through fifth received data, and to generate a noise detection signal when at least one of the values of the third, fourth, and fifth received data is different from the value of the first, second, sixth, and seventh received data.

The communication control circuit 13 counts the numbers of times that the plus correction request signal, the noise detection signal, and the minus correction request signal, respectively, are received from the majority circuit 14. Also, the communication control circuit 13 delays the output timing of the sampling clock signal (in this example, contains three pulses in each bit period) by, for example, one sampling clock period when the plus correction request signal is received, and advances the output timing of the sampling clock signal by, for example, one sampling clock period when the minus correction request signal is received. The amount (or period) by which the output timing of the sampling clock signal is delayed or advanced is not limited to one sampling clock period. For example, the output timing of the sampling clock signal may be delayed or advanced by one half (½) of the sampling clock period or three halves (3/2) of the sampling clock period.

The received data storing register 15 stores, for example, one frame ("frame" is described later) of received data, which are supplied from the majority circuit 14, based on a clock signal supplied from the communication control circuit 13. Also, in response to a read request from a CPU (not shown) that is a higher-level device, the received data storing register 15 supplies the stored received data via a terminal 16 (see FIG. 2) to the CPU. Meanwhile, in response to a read request from the CPU, the communication control circuit supplies the counts (the counted numbers of times) and statuses of the plus correction request signal, the noise detection signal, and the minus correction request signal via a terminal 17 to the CPU.

As illustrated in FIG. 2, the communication control circuit 13 may include a start bit detection circuit 21, a stop bit detection circuit 22, a reception control circuit 23, a sampling clock generating circuit 24, a plus correction counter 25, a minus correction counter 26, a noise detection counter 27, and a status register 28.

Communication data input to the terminal 11 include a start bit at the beginning and a stop bit at the end. The data between the start bit and the stop bit are called a frame. The start bit detection circuit 21 detects the start bit and supplies a start bit detection signal to the reception control circuit 23 and the sampling clock generating circuit 24. Meanwhile, the stop bit detection circuit 22 detects the stop bit and supplies a stop bit detection signal to the reception control circuit 23.

When receiving the start bit detection signal, the reception control circuit 23 generates a first clock signal that is synchronized with the start bit detection signal and has a cycle (or clock period) corresponding to one bit period of the communication data and supplies the first clock signal to the sampling clock generating circuit 24 and the received data storing register 15. Also, a received bit counter 31 of the reception control circuit 23 counts cycles (or pulses) of the first clock signal and thereby obtains the number of received bits. Further, the reception control circuit 23 detects a frame between the start bit and the stop bit and reports the detection of the frame to other components in FIG. 2. The received data storing register 15 stores the received data in synchronization with the first clock signal.

A control register 32 of the reception control circuit 23 stores control information including bit patterns of the start bit and the stop bit; information indicating one bit period of communication data; thresholds for counts of the plus correction counter 25, the minus correction counter 26, and the noise detection counter 27; and values of "m" and "n" (of the sampling clock signal). The control information is set in the control register 32 by the CPU.

The bit patterns of the start bit and the stop bit are supplied to the start bit detection circuit 21 and the stop bit detection circuit 22, respectively. The thresholds are supplied to the plus correction counter 25, the minus correction counter 26, and the noise detection counter 27. The values of "m" and "n" are supplied to the sampling clock generating circuit 24. In FIG. 2, for brevity, some of lines indicating connections between the reception control circuit 23 and other components are omitted.

The sampling clock generating circuit 24 may include a sampling clock generating counter 33. The sampling clock generating counter 33 is an "m-nary" ring counter. For example, when m=4 and n=3, the sampling clock generating counter 33 is a quaternary ring counter. The sampling clock generating counter 33 is reset to zero when the start bit detection signal is received and counts cycles (or pulses) of a second clock signal having a frequency that is "m" (in this example "4") times greater than the frequency of the first clock signal. The second clock signal is generated by the sampling clock generating circuit 24. The sampling clock generating circuit 24 supplies the second clock signal as the sampling clock signal to the received data sampling circuit 12 at timings when the count of the sampling clock generating counter 33 is "1", "2", and "3". The received data sampling circuit 12 samples the communication data based on the sampling clock signal generated as described above.

The sampling clock generating counter 33 decrements the count by one when the plus correction request signal is received from the majority circuit 14 and increments the count by one when the minus correction request signal is received from the majority circuit 14 to delay and advance the output timing of the sampling clock signal.

The majority circuit 14 performs a majority operation on the values represented by the first, second, and third received data to determine a majority value and supplies the majority value as received data of the corresponding bit period to the received data storing register 15. The majority circuit 14 may include a plus correction determining unit 34, a minus correction determining unit 35, and a noise detection unit 36.

The plus correction determining unit 34 generates a plus correction request signal when the value of the first received data is different from the value of the second and third received data and supplies the plus correction request signal to the sampling clock generating counter 33 and the plus correction counter 25.

The minus correction determining unit 35 generates a minus correction request signal when the value of the third received data is different from the value of the first and second received data and supplies the minus correction request signal to the sampling clock generating counter 33 and the minus correction counter 26.

The noise detection unit 36 generates a noise detection signal when the value of the second received data is different from the value of the first and third received data and supplies the noise detection signal to the noise detection counter 27. Alternatively, the plus correction request signal, the minus correction request signal, and the noise detection signal may also be supplied to the status register 28.

The plus correction counter 25 counts the number of times the plus correction request signal is received, for example, in one frame period (hereafter, the counted value may be called "a count of the plus correction request signal"). The plus correction counter 25 writes the count of the plus correction request signal itself or a plus correction flag in the status register 28. The plus correction flag takes, for example, a value of "1" when the count of the plus correction request signal is greater than or equal to a threshold for the count of the plus correction request signal. The threshold is supplied to the plus correction counter 25 from the control register 32.

The minus correction counter 26 counts the number of times the minus correction request signal is received, for example, in one frame period (hereafter, the counted value may be called "a count of the minus correction request signal"). The minus correction counter 26 writes the count of the minus correction request signal itself or a minus correction flag in the status register 28. The minus correction flag takes, for example, a value of "1" when the count of the minus correction request signal is greater than or equal to a threshold for the count of the minus correction request signal. The threshold is supplied to the minus correction counter 26 from the control register 32.

The noise detection counter 27 counts the number of times the noise detection signal is received, for example, in one frame period (hereafter, the counted value may be called "a count of the noise detection signal"). The noise detection counter 27 writes the count of the noise detection signal itself or a noise detection flag in the status register 28. The noise detection flag takes, for example, a value of "1" when the count of the noise detection signal is greater than or equal to a threshold for the count of the noise detection signal. The threshold is supplied to the noise detection counter 27 from the control register 32.

Thus, the status register 28 stores the count of the plus correction request signal or the plus correction flag, the count of the minus correction request signal or the minus correction flag, and the count of the noise detection signal or the noise detection flag. The CPU (as a higher-level device) can access the status register 28 to determine the conditions of the communication environment. The CPU can also update the thresholds for the counts counted by the plus correction counter 25, the minus correction counter 26, and the noise detection counter 27 according to the conditions of the communication environment.

The plus correction counter 25, the minus correction counter 26, and the noise detection counter 27 may also be configured to count the numbers of times of the corresponding signals in two or more frame periods.

The status register 28 stores the count of the plus correction request signal or the plus correction flag, the count of the minus correction request signal or the minus correction flag, and the count of the noise detection signal or the noise detection flag, and supplies the stored information via the terminal 17 to the CPU in response to a read request from the CPU. The status register 28 may also be configured to store flags indicating bit positions in the received data storing register 15 of received data that caused generation of the plus correction request signal, the minus correction request signal, and the noise detection signal in one frame, and to supply the flags via the terminal 17 to the CPU in response to a read request from the CPU.

<Operations>

Figure 3:
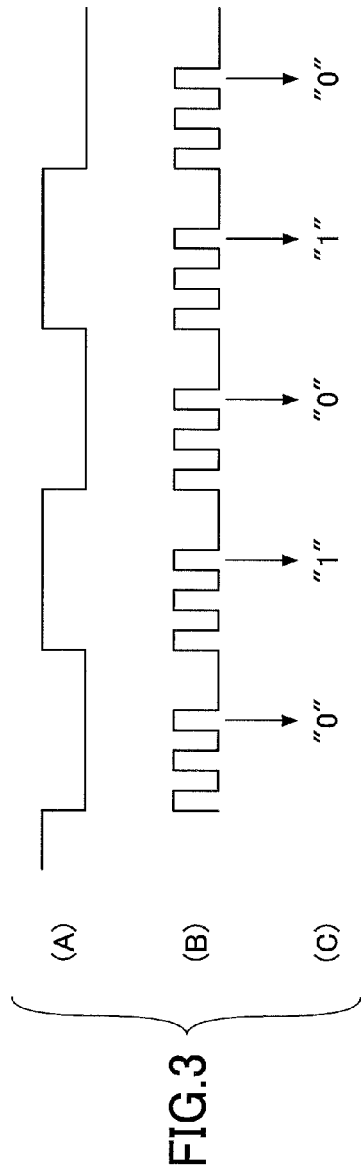
FIG. 3 is a drawing used to describe an exemplary sampling method of an embodiment.
Figure 4:
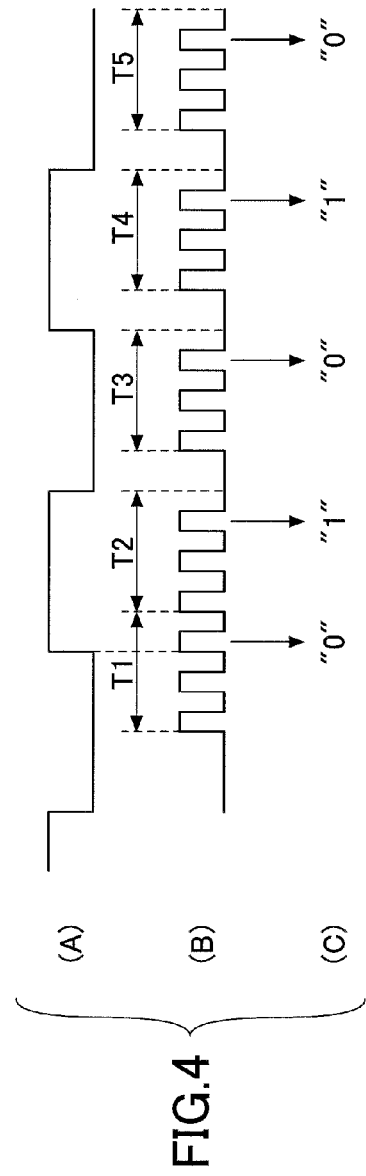
FIG. 4 is another drawing used to describe an exemplary sampling method of an embodiment.
Figure 5:
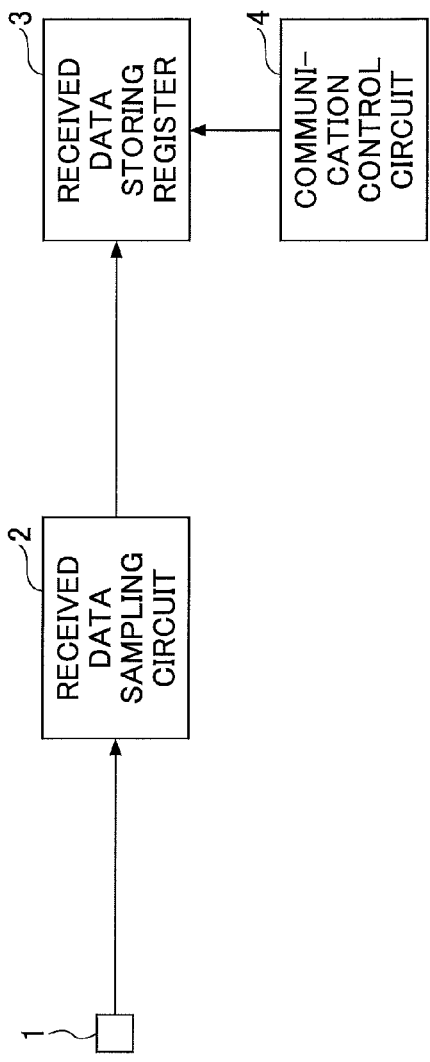
FIG. 5 is a block diagram illustrating a configuration of a related-art communication circuit.
Figure 6:
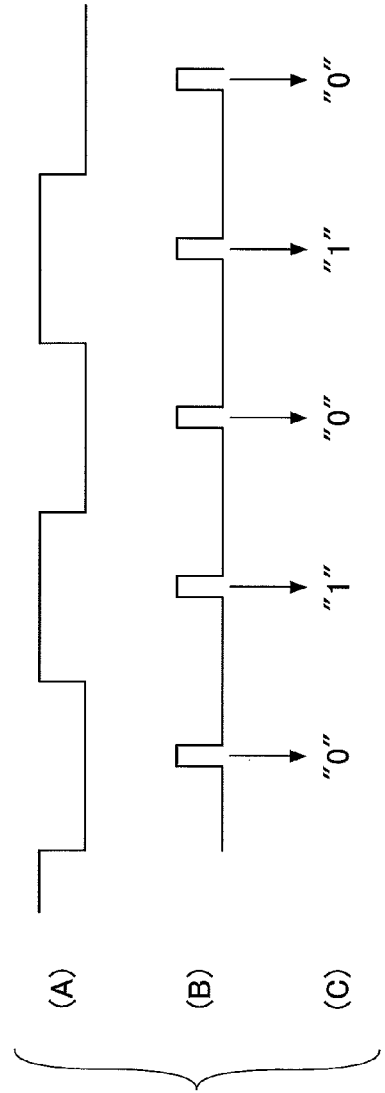
FIG. 6 is a drawing used to describe a related-art sampling method.

Exemplary operations of the communication circuit 1 are described below with reference to FIGS. 3 and 4. For example, when communication data represented by FIG. 3(A) are input to the terminal 11 and a sampling clock signal represented by FIG. 3(B) is generated, the communication data are sampled at timings when the sampling clock signal is high, and first, second, and third received data are obtained in each bit period of the communication data. In this case, the values of the first, second, and third received data in each bit period are the same and the majority circuit 14 outputs received data represented by FIG. 3(C).

In another exemplary case, communication data represented by FIG. 4(A) are input to the terminal 11 and a sampling clock signal is influenced by, for example, an error in detection timing of the start bit as illustrated in FIG. 4(B). In this case, in a period T1, the value of the first and second received data is "0" and the value of the third received data is "1", and therefore the majority circuit 14 outputs received data with a value "0" as illustrated in FIG. 4(C). Also in this case, since the value of the third received data is different from the value of the first and second received data, the minus correction determining unit 35 generates the minus correction request signal. In response to the minus correction request signal, the count of the sampling clock generating counter 33 is incremented by one, and the output timing of the sampling clock signal is thereby advanced in a period T2 as illustrated in FIG. 4(B).

As a result, the values of all the first, second, and third received data in the period T2 become "1". Also in each of subsequent periods T3, T4, and T5, the values of all the first, second, and third received data become the same.

The CPU can rewrite the values of "m" and "n" in the control register 32 and thereby set the number of pulses of the sampling clock signal in each bit period, for example, at "3", "5", or "7". Thus, the CPU can adjust the output timing of the sampling clock signal at an accuracy suitable for the communication environment. For example, increasing the number of pulses of the sampling clock signal in each bit period makes it possible to improve the reliability of received data.

In the above embodiment, the received data storing register 15 always stores (or accepts) received data indicating the majority value supplied from the majority circuit 14. Alternatively, the received data storing register 15 may be configured to receive the plus correction request signal and the minus correction request signal from the plus correction determining unit 34 and the minus correction determining unit 35 and to not store received data when the plus correction request signal or the minus correction request signal is received. This configuration makes it possible to discard received data when the output timing of the sampling clock signal is corrected (i.e., delayed or advanced).

As described above, an aspect of this disclosure provides a communication circuit and a method of adjusting a sampling clock signal that make it possible to synchronize the timing of the sampling clock signal with the timing of received data (or communication data).

The present invention is not limited to the specifically disclosed embodiments, and variations and modifications may be made without departing from the scope of the present invention.

What is claimed is:

1. A communication circuit that receives communication data in asynchronous serial communications, the communication circuit comprising:
   a start bit detection circuit to detect a start bit of the communication data;

a reception control circuit to generate a clock signal that is synchronized with the start bit;

a sampling clock generating circuit configured to generate a sampling clock signal according to the clock signal that is generated by the reception control circuit;

a sampling circuit configured to sample the communication data based on the sampling clock signal having a frequency that is "m" times greater than a bit rate of the communication data and containing "n" pulses in each bit period of the communication data, "m" being an integer greater than or equal to 4, "n" being an odd number less than "m" to obtain "n" sets of received data; and a majority circuit configured to perform a majority operation on values of "n" sets of received data in each bit period of the communication data to determine a majority value and to output the majority value as received data of the corresponding bit period, wherein the sampling clock generating circuit is configured to delay the sampling clock signal by a predetermined amount relative to the start bit when a value of a first one or more of the "n" sets of received data is different from a value of a rest of the "n" sets of received data, and to advance the sampling clock signal by the predetermined amount relative to the start bit when a value of a last one or more of the "n" sets of received data is different from a value of a rest of the "n" sets of received data.

2. The communication circuit as claimed in claim 1, further comprising:

a counter configured to count a number of times that the sampling clock signal is delayed by the predetermined amount or a number of times that the sampling clock signal is advanced by the predetermined amount.

3. The communication circuit as claimed in claim 2, further comprising:

a register, wherein the counter is configured to set a correction flag in the register when the number of times that the sampling clock signal is delayed by the predetermined amount or the number of times that the sampling clock signal is advanced by the predetermined amount becomes greater than or equal to a threshold.

4. The communication circuit as claimed in claim 1, further comprising:

a received data storing unit configured to store the received data output from the majority circuit, wherein the received data storing unit is configured to stop storing the received data when the sampling clock signal is delayed or advanced by the predetermined amount by the sampling clock generating circuit.

5. The communication circuit as claimed in claim 1, further comprising:

a received data storing unit configured to store the received data output from the majority circuit; and a register configured to store a flag indicating a bit position in the received data storing unit of the received data that caused the sampling clock generating unit to delay or advance the sampling clock signal by the predetermined amount.

6. The communication circuit as claimed in claim 1, wherein at least one of values of "m" and "n" is changeable.

7. The communication circuit as claimed in claim 1, wherein the majority circuit includes a correction determining unit configured to generate a first correction request signal when the value of the first one or more of the "n" sets of received data is different from the value of the rest of the "n" sets of received data to request the sampling clock generating circuit to delay the sampling clock signal, and generate a second correction request signal when the value of the last one or more of the "n" sets of received data is different from the value of the rest of the "n" sets of received data to request the sampling clock generating circuit to advance the sampling clock signal.

8. The communication circuit as claimed in claim 1, further comprising:

a counter; and a register, wherein the majority circuit includes a noise detection unit configured to send a noise detection signal to the counter when a value of one or more of the "n" sets of received data between the first one or more of the "n" sets of received data and the last one or more of the "n" sets of received data is different from a rest of the "n" sets of received data; and the counter is configured to count a number of times that the noise detection signal is received and to set a noise detection flag in the register when the counted number of times becomes greater than or equal to a threshold.

9. A method performed by a communication circuit that receives communication data in asynchronous serial communications, the method comprising:

detecting, by a detection circuit, a start bit of the communication data;

generating, by a reception control circuit, a clock signal that is synchronized with the start bit;

generating a sampling clock signal according to the clock signal that is generated by the reception control circuit;

sampling the communication data based on the sampling clock signal having a frequency that is "m" times greater than a bit rate of the communication data and containing "n" pulses in each bit period of the communication data, "m" being an integer greater than or equal to 4, "n" being an odd number less than "m";

performing a majority operation on values of "n" sets of received data in each bit period of the communication data to determine a majority value and outputting the majority value as received data of the corresponding bit period;

delaying the sampling clock signal by a predetermined amount relative to the start bit when a value of a first one or more of the "n" sets of received data is different from a value of a rest of the "n" sets of received data; and advancing the sampling clock signal by the predetermined amount relative to the start bit when a value of a last one or more of the "n" sets of received data is different from a value of a rest of the "n" sets of received data.

\* \* \* \* \*